United States Patent

[11] 3,595,103

| | | |
|---|---|---|
| [72] | Inventor | Ernest Wildhaber<br>124 Summit Drive, Rochester, N.Y. 14620 |
| [21] | Appl. No. | 828,942 |
| [22] | Filed | May 29, 1969 |
| [45] | Patented | July 27, 1971 |

[54] ANGULAR DRIVE ARRANGEMENT
12 Claims, 12 Drawing Figs.

[52] U.S. Cl. ................................................ 74/800
[51] Int. Cl. .................................................. F16h 1/28
[50] Field of Search ............................................ 74/799,
800, 757, 60; 64/9 R

[56] References Cited
UNITED STATES PATENTS

| 1,144,807 | 6/1915 | Bronner et al. | 74/800 |
|---|---|---|---|
| 1,611,981 | 12/1926 | Amberg | 74/800 |
| 2,480,039 | 8/1949 | Miller, Jr. | 64/9 R |
| 2,578,764 | 12/1951 | Trbojevich | 64/9 R |
| 2,699,690 | 1/1955 | Kobler | 74/800 |
| 2,897,660 | 8/1959 | Croset | 64/9 R |
| 2,983,118 | 5/1961 | Wicoff | 64/9 R |
| 3,385,135 | 5/1968 | Strandberg | 74/800 |

*Primary Examiner*—C. J. Husar
*Attorney*—Shlesinger, Fitzsimmons & Shlesinger

ABSTRACT: This angular drive arrangement contains an element and a part having axes intersecting at a fixed angle. Rolling means constrain them to turn at a one to one ratio with respect to each other. Arms of said element reach through openings provided on said part and are connected on the opposite side of said part, so that the element may be journaled on both sides of said part.

In a planetary transmission a pair of equal stationary bevel gears straddle and mesh with a pair of equal gears rigid with said part. Each gear of said part has preferably one tooth more than its mate. The part is a single planet capable of applying driving load in diametrically opposite regions, with minimum bearing loads.

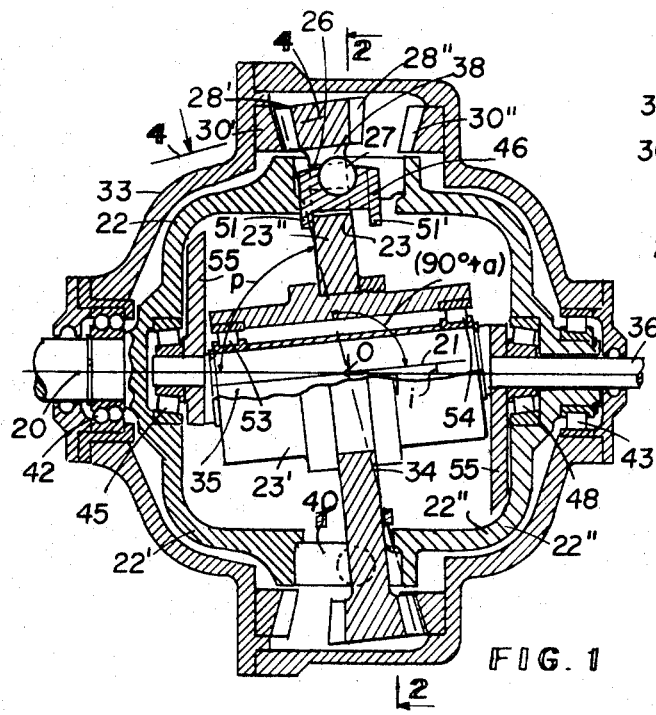
FIG. 1
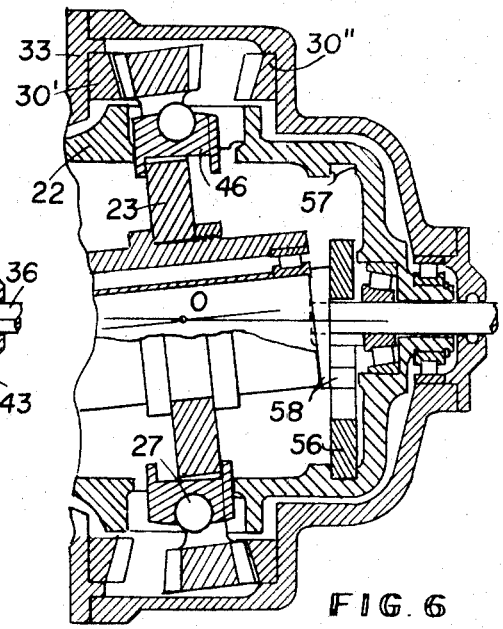
FIG. 6
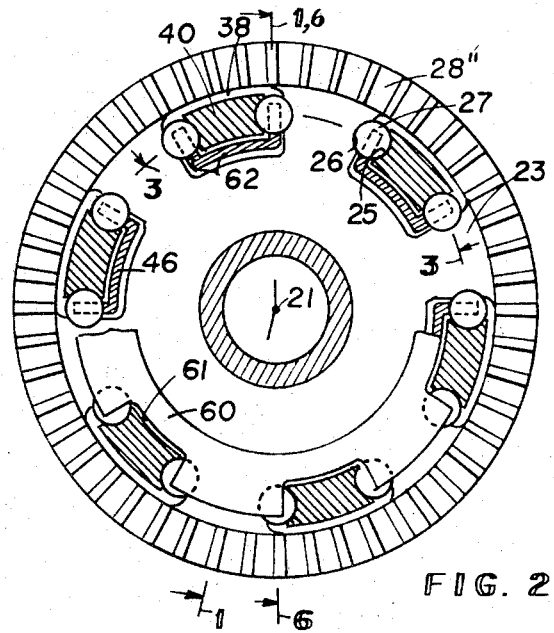
FIG. 2
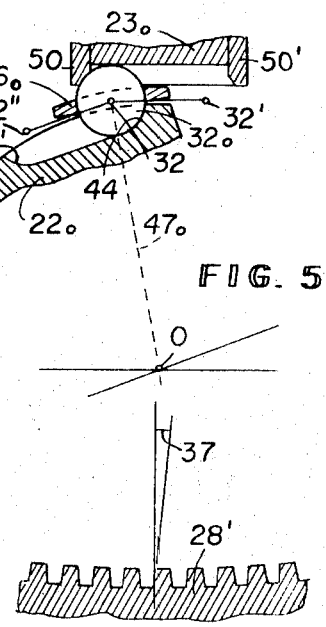
FIG. 5
FIG. 4
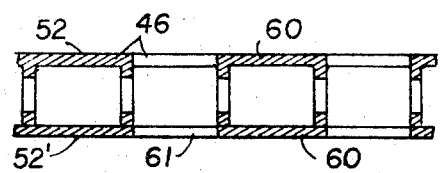
FIG. 3
INVENTOR:
Ernest Wildhaber INVENTOR:
Ernest Wildhabe

ANGULAR DRIVE ARRANGEMENT

One object of the invention is to achieve driving contact between said element and part all around the periphery, unlike that of a conventional gear drive, where driving contact exists only in a single region.

A further object is to combine this construction with a bevel gear drive coaxial with the element and part, to achieve for instance a planetary reduction gear for ratios between 20:1 and about 100:1.

Another aim is to devise a planetary arrangement capable of applying driving gear-tooth load in two diametrically opposite places with a single planet.

Other objects will appear in the course of the specification and in the recital of the appended claims.

Embodiments of the invention will be described with the drawings, in which

FIG. 1 is a section taken through the axes of said element and part along lines 1-1 of FIG. 2.

FIG. 2 is an axial view of said part and a section taken along lines 2-2 (FIG. 1) of the element and further members.

FIG. 3 is a fragmentary cylindrical section of the cage 46 taken through the ball centers along arc 3-3 of FIG. 2 and developed into a plane.

FIG. 4 is a fragmentary normal section taken through the teeth of gear 28' along lines 4-4 of FIG. 1.

FIG. 5 is a diagram explanatory of a general way of keeping the balls in the bisector plane of the axes of the element and part.

FIG. 6 is an axial section similar to FIG. 1, showing a modified way of mass balance. The section is taken along line 6-6 of FIG. 2.

Figure 7:
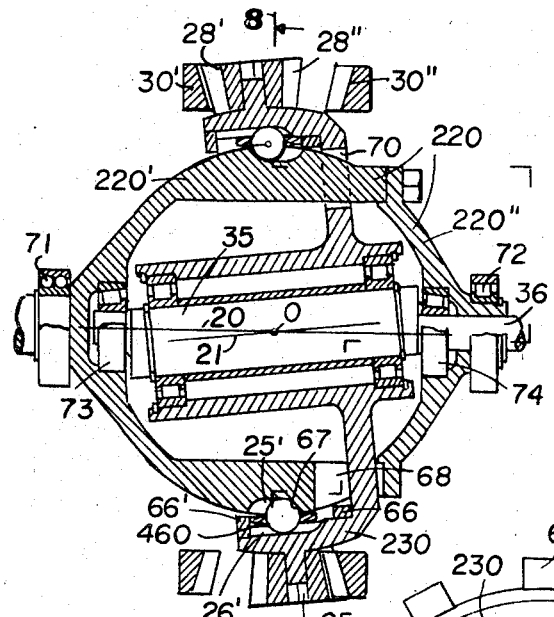
FIG. 7 is an axial section similar to FIG. 1, showing a modification.

In FIGS. 1 to 4 numerals 20 and 21 denote the axes of an element 22 and a part 23 that engage through balls 27. The axes 20, 21 intersect at 0 at a fixed angle ($180°-i$). Element 22 contains ways 25 parallel to its axis 20. Part 23 likewise contains ways 26 parallel to its axis 21. The ways are engaged by balls 27. The balls are kept in the bisector plane of the axes 20, 21 by means further described hereafter, so that uniform motion is transmitted between the element and part at a 1:1 ratio.

FIG. 1 specifically refers to a planetary transmission. A pair of coaxial bevel gears 28', 28'' of equal tooth number N are rigid with part 23 and in the instance illustrated formed integral with it. The axis of these gears coincides with the axis 21 of part 23. The gears 28', 28'' mesh with a pair of bevel gears 30', 30'' whose common axis coincides with axis 20. They have equal tooth numbers $n$.

Bevel gears with intersecting axes move so that two (imagined) conical pitch surfaces roll on each other without sliding. The pitch surfaces contact along the instant axis 34, the axis of instantaneous relative motion. The angle included between the pitch-cone elements and the axis is called the pitch angle. Gears 30', 30'' have a pitch angle $p$ smaller than a right angle but generally larger than 60°. The gears 28', 28'' have a pitch angle ($90°+a$) larger than a right angle. Gears 28', 28'' preferably contain one more tooth than gears 30', 30''.

Pitch angle $p$ of gears 30', 30'' can be determined by the formula:
$$\sin p = \frac{n}{N} \cdot \cos a$$

Also $\quad i = 90° - (p + a)$ as can be demonstrated mathematically.

It should be noted that angle $i$ decreases with increasing angle $a$.

Element 22 and part 23 may run either on fixed axes, or one of them may roll on the other. In the example illustrated in FIGS. 1 to 4 part 23 rolls as a planet on element 22, which is the driven member. Part 23 with its gears 28', 28'' also rolls on the gears 30', 30'' that are maintained stationary. Together with housing 33, the gears 30', 30'' constitute the first element of the drive. Element 22 will be referred to as the second element. Part 23 is rotatably mounted on a third element 35 coaxial with said other two elements and containing drive shaft 36.

Sliding in the teeth of the intermeshing gears is proportional to the distance of the contact point from the instant axis 34 and proportional to the relative angular velocity $w_i$ about the instant axis. $w_i$ is obtainable in known manner by vectorial addition of the angular velocities of the intermeshing gears if these are or were run on fixed axes.

If $w$ denotes the angular velocity of the driving third element 35 of the planetary drive, $w_i$ may be computed as:
$$w_i = w(\sin i / \cos a)$$

As $\sin i$ and $i$ decrease with increasing angle $a$, tooth sliding also decreases with increasing angle $a$. Practical limitations keep angle $a$ preferably within 12°.

The mating bevel gears here have intimate tooth contact. The contacting tooth surfaces depart only little from a full match. The tooth-profile inclination (37, FIG. 4), can be chosen freely, and may be kept small, less than 12°. Comparable internal mesh on parallel-axes gears requires excessive profile inclination to avoid so-called internal interference. It further requires sharply reduced tooth depth. These combine to produce a short duration of profile contact. Such limitations are entirely avoided with the angular design. In addition a single planet is capable of applying driving tooth load in two diametrically opposite regions, a feat not possible with parallel-axes gears.

Part 23 contains a hub portion 23' and a generally disk-shaped portion 23'' rigidly secured to the hub portion or formed integral with it. Portion 23'' contains the slightly internal gears 28', 28''. It further contains openings 38 with ways 26 on their sides. The ways 26 extend parallel to the axis 21 of part 23 and perpendicular to the drawing plane of FIG. 2.

Element 22, the second element of the drive, is made up of two portions 22', 22'' rigidly secured together, as by screws (not shown). Portion 22' contains armlike projections 40 that reach through the openings 38 and that are connected by the circular member 22'' on the opposite side of part 23. Element 22 is rotatably mounted on both sides of part 23 in the stationary housing 33 by well-spread bearings 42, 43. This provides a rigid mounting.

The armlike projections 40 have ways 25 formed on their sides. Ways 25 are similar to ways 26 of part 23 and extend parallel to the axis 20 of element 22. Balls 27 engage both ways 25 and 26. The profile of the ways either matches the circular ball profile, or has a slightly larger radius, as is customary on ball bearings.

A cage 46 maintains the balls in a circle.

Known constant-velocity universal joints with ways parallel to the axis of the respective joint member use complex mechanisms to maintain the balls in the bisector plane, in the plane that bisects the angle between said members. The invention simplifies this mechanism for the case where said axes include a fixed angle.

The balls then move through a fixed distance on their ways, keeping in the bisector plane. The invention fixes the end positions of the balls, so that the plane in which the balls are maintained by cage 46 is inclined at the required angle.

The principle remains the same, whether the ways are on the sides as in FIGS. 1 to 4, or whether the ways are provided internally on part $23_o$ and externally on element $22_o$, as in diagram FIG. 5. In operation the centers 32 of these balls $32_o$ move to end positions 32' and 32'' with respect to part $23_o$ and to element $22_o$ respectively, while being maintained in the bisector plane $47_o$. They come to a stop in these required end positions, between shoulder 44 of element $22_o$ and disk 50 secured to part $23_o$. After half a turn of the element and part the same ball $32_o$ is held between shoulder 44' and disk 50'. This occurs with each ball. Thus the correct inclination of the plane of the ball centers is assured, as the balls are all held in a plane by cage $46_o$.

In the embodiment of FIGS. 1, to 4 the stop surfaces act on the cage 46 rather than on the balls. Cage 46 has inward projections 51, 51' (FIG. 1) which contact surfaces of revolution provided on the sides of part 23. The outside surfaces 52, 52' of the cage (FIG. 3) bear against surfaces provided on element 22. Thus the cage is held at the required inclination.

The second element 22 is rotatably mounted in the housing 33, that represents the stationary first element, on bearings 42, 43. The third element 35, that carries the planet part 23, is rotatably mounted in the second element on bearings 45, 48. Part 23 is mounted on the third element 35 by bearings 53, 54.

Rotation of drive shaft 36 in either direction produces inertia loads that tend to move the bevel gears of part 23 deeper into mesh with their stationary mating gears. In the position shown in FIG. 1 they tend to turn part 23 counterclockwise about 0. This tendency is counteracted by counterbalance weights 55 rigidly secured to drive shaft 36.

The gear-tooth pressure can be resolved into a peripheral component and into a component in the direction of the tooth depth. The latter produces a turning moment on part 23 opposite to its inertia moment. When the drive is run at an approximately constant velocity the two opposite turning moments can be made to balance each other at a given load, by using a profile inclination on the gear teeth computed for balance. Balance is attainable at all loads if the transmitted load is proportional to the square of the angular velocity, as may occur in a propeller drive.

When balance is achieved the load on the bearings 53, 54 is a minimum. Bearings 45, 48 however still have to carry the inertia moment in addition to other loads.

The embodiment of FIG. 6 is identical with the just described embodiment, except for the mass-balance means. Here a pair of rings 56 are used that roll on the slow-speed element 22. They are guided by grooves 57 provided in element 22 and by a member 58 that reaches inside of ring 56. When said balance is achieved the bearings 46, 48 are free of the inertia moment.

An inertia moment exists also on cage 46. It tends to press the cage against element 22 about center 0. For this reason part 23 does not need to fully touch the projections 51, 51' of cage 46, but may have some slight clearance therefrom. This permits part 23 to float axially to the exact position where equal loads are exerted on the opposite gears 28', 28''. These equal and opposite loads provide a pure turning moment and minimum bearing loads.

While axial displacement of part 23 in principle tends to shift the tooth bearing lengthwise of the teeth, this shift decreases with decreasing profile inclination 37 (FIG. 4) and becomes minimal with the very small axial displacements needed.

Cage 46 contains two side flanges 60 (FIGS. 3 and 2) having slots 61. One of the flanges 60 contains portions 62 of U-shape reaching to the other flange 60, which is secured to them. The balls 27 are held by the radial arms of the U-shape.

While the described ways are parallel to the axis of their member, other ways extending at a constant distance from said axis might also be used.

FURTHER EMBODIMENTS

Figure 8:
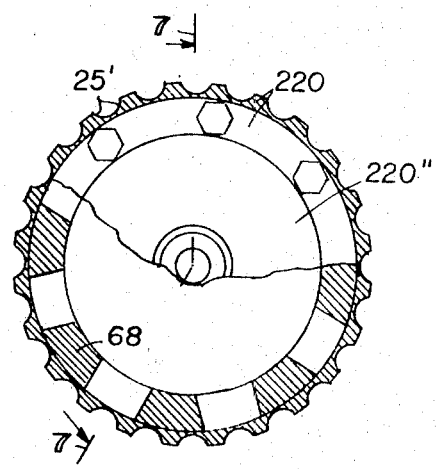
FIG. 8 is an axial view and a section taken along line 8-8 of FIG. 7, showing element 220.
Figure 9:
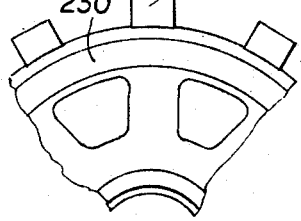
FIG. 9 is a fragmentary axial view of the main body of part 230.

The embodiment of FIGS. 7 to 9 uses the same housing 33 as the described embodiments. Housing 33 is not shown. Shown only are the stationary bevel gears 30', 30'' secured to it. The transmitted motions and the angles are exactly the same as before. Part 230 contains the described gears 28', 28'' meshing with the gears 30', 30''. They are however provided on separate rings that are rigidly secured together and to the main body of part 230. Projections 64 of the body engage slots 65 at the rear of the gear rings. The two rings may be welded together at their outside ends.

In this embodiment the ways 26' are provided internally on part 230, and the ways 25' are arranged externally on element 220. Both sets of ways are parallel to the axes 21, 20 of the respective members. The ways 25', 26' are engaged by balls 27 that are held in a cage 460. In the end positions of ball travel the cage contacts or nearly contacts rings 66, 66' secured to part 230 and further contacts shoulders 67 provided at the ends of the ways 25'.

Element 220 consists of a main portion 220' provided with arms 68 that reach through openings 70 of the radially extending portion of part 230. The arms 68 are rigidly connected on the opposite side of part 230 by a circular member 220''. This adds to the rigidity and permits mounting element 220 on amply spaced bearings 71, 72. Part 230 is rotatably mounted on the described element 35 exactly like part 23. Element 35 is mounted on bearings 73, 74 in element 220.

Whether or not to use counterweights depends on the speed of the drive shaft 36. At moderate speeds they are unnecessary. They are not shown in the embodiments of FIGS. 7 to 12, but may be added if needed.

Figure 11:
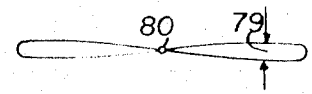
FIG. 11 is an exaggerated radial view of the path described by a point of a radial roller axis thereof.
Figure 10:
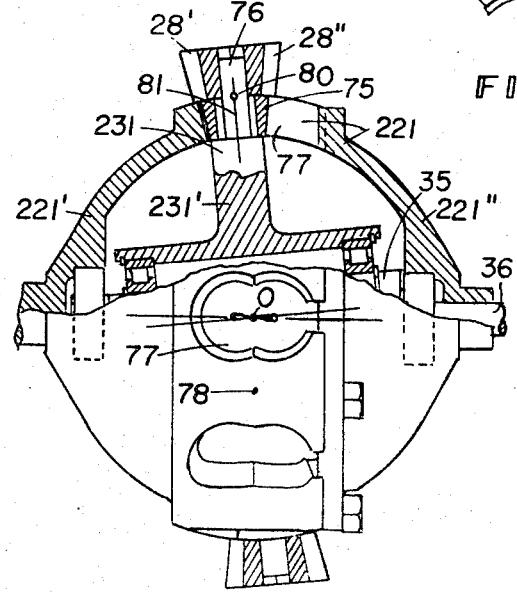
FIG. 10 is an axial section of a further modification, shown partly in view.
Figure 12:
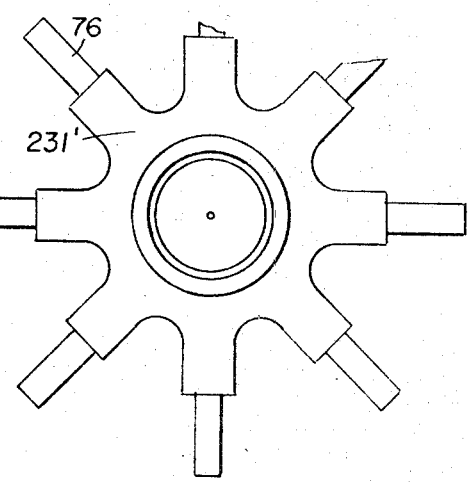
FIG. 12 is an axial view of the supporting spider 231' of FIG. 10.

FIGS. 10 to 12 illustrate a further embodiment also providing the same motion. It uses a first element as described with FIGS. 1 to 4, comprising a stationary housing and gears 30', 30'' secured thereto. It is not shown here. Part 231 comprises the gears 28', 28'' that mesh with said gears 30', 30'', a supporting spider 231' to which the gears 28', 28'' are rigidly secured, and rollers 75 mounted on radial pins 76 rigid with said spider. Gears 28', 28'' engage extensions of pins 76. The second element, denoted at 221, is made up of a main portion 221' and of a circular end member 221''. Portion 221' contains ways 77 for engagement with the rollers 75. The ways 77 form arms 78. These are connected and supported by circular member 221'' on the opposite side of part 231.

Part 231 is rotatably mounted on the third element denoted at 35 in the described manner.

The ways 77 have a changing width, the maximum width being at a distance from the midportion. The ways can best be described by the relative path of a point 80 of the pin axis 81. It is shown with exaggeration in FIG. 11. This diagram corresponds to an angle $i$ of 15°. If R denotes the radius 0—80, the maximum width 79 of the flat figure 8 amounts to $R(1 - \cos i)$. At point 80 the two branches of the figure 8 include an angle i with each other.

The ways 77 have side surfaces such as may be generated by a grinding wheel or milling cutter having the same working surface as a roller 75, when said wheel or cutter repeats the described relative motion. The wheel could be mounted on a radial axis 81 that turns about a fixed axis 21 while element 221 turns about axis 20 through the same angles at all times.

While a planetary reduction gear has been described, where 36 is the fast-running drive shaft and the second element is the slow-speed member, the gearing could also be used as a speedup drive. Then the said second element is the member driving a high-speed shaft 36. Also the gearing could be used with fixed axes, the element with shaft 36 standing still in normal operation. The first element with gears 30', 30'' is then no longer stationary. With the second element it is one of the driving and driven members, that turn at slightly different speeds.

The angular drive arrangement can also be used without the bevel gears, to transmit a one to one ratio in a fixed-angle drive. It may be used with fixed axes or as a planetary drive. As a planetary drive it may be used for instance to control the turning position of a wabble plate in an arrangement where pistons reciprocate in parallel cylinders.

While the invention has been described with several embodiments thereof, it can be further applied without departing from its spirit, by simply using the knowledge of the art to which the invention pertains. For definition of its scope it is relied on the appended claims.

I claim:
1. Angular drive arrangement, comprising
two pairs of gears having intersecting axes and teeth extending at an angle to the respective gear axes,
the two gears of each pair having different tooth numbers, but corresponding gears of both pairs being coaxial and having equal tooth numbers,
the coaxial gears with equal tooth numbers being rigid with each other and facing in opposite directions so that two outer gears straddle the other two gears,
said two outer gears and portions rigid therewith constituting a first element,
a second element coaxial with said first element containing a plurality of ways uniformly spaced about its axis,
said ways extending principally lengthwise of said axis,
rolling means engaging said ways,
a part coaxial and rigid with said straddled gears,
said part being in engagement with said rolling means to constrain a velocity ratio of 1:1 between said part and said second element,
a third element on which said part is rotatably mounted,
said third element being coaxial with the other two elements,
and means for maintaining one of said elements stationary, the other two elements being the driving and driven members.

2. Angular drive arrangement according to claim 1, wherein the gears are bevel gears all having pitch angles larger than 60°,
the tooth ratio of the gear pairs differs from one to one by less than 10 percent,
said part having openings between the region of said rolling means and its axis,
the second element extending through said openings and being journaled on both sides thereof.

3. Angular drive arrangement according to claim 1, wherein said rolling means are balls,
the second element and said part both contain ways for engagement with said balls,
the second element and said part contain stop surfaces terminating the ball movement along said ways.

4. Angular drive arrangement according to claim 3, wherein the ways are parallel to the axis of the second element and of said part respectively,
a cage is provided for maintaining the balls in a plane,
the stop surfaces act on said cage.

5. Angular drive arrangement according to claim 1, wherein the first element is maintained stationary,
the second element is the driven member,
the third element carrying the straddled gears as a planet is the driver.

6. Angular drive arrangement comprising
two pairs of gears having intersecting axes and teeth extending at an angle to the respective gear axes,
the two gears of each pair having different tooth numbers, but corresponding gears of both pairs being coaxial and having equal tooth numbers,
the coaxial gears with equal tooth numbers being rigid with each other and facing in opposite directions, so that two outer gears straddle the other two gears,
said two outer gears and portions rigid therewith constituting a first element,
a second element coaxial with said first element containing a plurality of ways uniformly spaced about its axis,
said ways extending principally lengthwise of said axis,
a part coaxial and rigid with said straddled gears,
rollers journaled on said part and engaging said ways to constrain a velocity ratio of one to one between said part and said second element,
a third element on which said part is rotatably mounted,
said third element being coaxial with the other two elements,
and means for maintaining one of said elements stationary, the other two elements being the driving and driven member.

7. Angular drive arrangement according to claim 6, wherein the ways have a changing width, the maximum width being at a distance from the midportion.

8. Angular drive arrangement according to claim 6, wherein said part contains radial pins on which said rollers are mounted,
the two gears of said part engage extensions of said pins.

9. In an angular drive arrangement,
an element having a plurality of ways uniformly spaced about an axis, said ways extending at a constant distance from said axis,
rolling means engaging said ways,
a rotatable part having an axis intersecting the axis of said element at a fixed angle differing from 180° by less than 30°,
said part being in engagement with said rolling means to constrain a velocity ratio of one to one between said part and element,
openings provided in the body of said part between its axis and the region of said rolling means,
said element reaching through said openings with arms,
and a circular member secured to said arms to connect them.

10. Angular drive arrangement according to claim 9, wherein
the rolling means are balls,
the element and part both contain ways extending at a constant distance from their respective axes,
the element and part both contain stop surfaces for fixing the end position of the balls in their ways.

11. Angular drive arrangement according to claim 10, wherein
a cage keeps the balls aligned in a circle,
the stop surfaces act on said cage.

12. In an angular drive arrangement,
an element having a plurality of ways uniformly spaced about an axis,
another element rotatable about said axis,
a part rotatably mounted on said other element on an axis intersecting said axis at a fixed angle,
said part containing the same number of ways spaced about its own axis as the number of ways of the first-named element,
balls engaging the ways of both said part and of the first-named element, whereby in operation the balls roll back and forth along their ways a constant distance,
stops for fixing said distance,
openings provided in the body of said part between its axis and its ways,
the first-named element reaching through said openings, and comprising two portions rigidly secured together.